United States Patent
Birbo et al.

(10) Patent No.: US 7,136,856 B2
(45) Date of Patent: *Nov. 14, 2006

(54) MULTI-LEVEL SECURITY PROFILE REFRESH

(75) Inventors: Getachew G. Birbo, San Jose, CA (US); Joyce Yuan-Sheng Hsiao, San Jose, CA (US); Sandra L. Sherrill, San Jose, CA (US); Andrew D. Tollerud, San Jose, CA (US); Yoshinobu Ueno, San Jose, CA (US); Jack Chiu-Chiu Yuan, San Jose, CA (US); James E. Zimmer, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 461 days.

This patent is subject to a terminal disclaimer.

(21) Appl. No.: 10/310,399

(22) Filed: Dec. 4, 2002

(65) Prior Publication Data

US 2004/0111413 A1 Jun. 10, 2004

(51) Int. Cl.
*G06F 17/00* (2006.01)
*G06F 12/00* (2006.01)

(52) U.S. Cl. .................. 707/9; 707/3; 707/4; 707/100; 711/106; 711/175

(58) Field of Classification Search .................. 707/9, 707/1, 100, 3–4; 713/200–201, 168; 711/163, 711/167, 106, 175
See application file for complete search history.

(56) References Cited

U.S. PATENT DOCUMENTS

| | | | |
|---|---|---|---|
| 5,734,718 A * | 3/1998 | Prafullchandra | 713/183 |
| 6,058,451 A * | 5/2000 | Bermingham et al. | 711/106 |
| 6,216,212 B1 * | 4/2001 | Challenger et al. | 707/8 |
| 6,219,680 B1 * | 4/2001 | Bernardo et al. | 715/501.1 |
| 6,239,793 B1 * | 5/2001 | Barnert et al. | 715/500.1 |
| 6,385,693 B1 * | 5/2002 | Gerszberg et al. | 711/118 |
| 6,738,908 B1 * | 5/2004 | Bonn et al. | 707/9 |
| 6,792,540 B1 * | 9/2004 | Smith et al. | 707/9 |
| 2001/0047349 A1 * | 11/2001 | Easty et al. | 707/3 |
| 2002/0015042 A1 * | 2/2002 | Robotham et al. | 345/581 |
| 2002/0112121 A1 * | 8/2002 | Gerszberg et al. | 711/118 |
| 2002/0147770 A1 * | 10/2002 | Tang | 711/137 |
| 2003/0097597 A1 * | 5/2003 | Lewis | 713/202 |
| 2003/0126136 A1 * | 7/2003 | Omoigui | 707/10 |
| 2003/0154110 A1 * | 8/2003 | Walter et al. | 705/3 |
| 2004/0034795 A1 * | 2/2004 | Anderson et al. | 713/201 |
| 2004/0039740 A1 * | 2/2004 | Artobello et al. | 707/9 |
| 2004/0044655 A1 * | 3/2004 | Cotner et al. | 707/3 |
| 2004/0064351 A1 * | 4/2004 | Mikurak | 705/7 |
| 2004/0078334 A1 * | 4/2004 | Malcolm et al. | 705/50 |

(Continued)

FOREIGN PATENT DOCUMENTS

WO    WO 01/44904 A2    6/2001

*Primary Examiner*—Jean M. Corrielus
*Assistant Examiner*—Anh Ly
(74) *Attorney, Agent, or Firm*—Kunzler & Associates (57) ABSTRACT

A request is received from a user associated with the client and a transaction aging value is copied to a security aging value associated with the cached user security profile if the transaction aging value is specified with the user request. A decay time is calculated utilizing a profile refresh time stamp associated with the cached user security profile and a system clock. The cached user security profile is then refreshed if a refresh event occurs.

27 Claims, 8 Drawing Sheets

U.S. PATENT DOCUMENTS

2005/0114604 A1* 5/2005 Artobello et al. ........... 713/200
2005/0192957 A1* 9/2005 Newbold ...................... 707/5

* cited by examiner

MULTI-LEVEL SECURITY PROFILE REFRESH

CROSS-REFERENCE TO RELATED APPLICATIONS

This application is related to the following commonly assigned patent application:

The application, entitled "METHOD, COMPUTER PROGRAM PRODUCT, AND SYSTEM FOR GLOBAL REFRESH OF CACHED USER SECURITY PROFILES", filed on Aug. 23, 2002 by Yuan et al., U.S. application Ser. No. 10/227,123, is incorporated by reference herein. This application will be hereinafter referred to as the "Global Security Profile Refresh" application.

FIELD OF INVENTION

The present invention relates generally to accessing databases, and in particular, to refreshing cached user security profiles utilized to authorize user access to information controlled by a database management system (DBMS).

BACKGROUND

Databases, such as IBM's IMS (Information Management System), are well known in the art. (IMS is a trademark of International Business Machines Corporation in the United States, other countries, or both.) IMS is a hierarchical database management system (HDBMS) with wide spread usage in many large enterprises where high transaction volume, reliability, availability and scalability are of the utmost importance. IMS provides software and interfaces for running the businesses of many of the world's largest corporations.

A large DBMS, such as IMS, is highly scalable and in some enterprise environments may accommodate thousands, or even tens of thousands, of users connected to the system at any given point in time. Furthermore, the information and data managed by the DBMS may be highly sensitive data, critical to the operation of the enterprise as well as critical to the individual users of the DBMS system. Travel reservation systems, inventory control, and online banking systems are some typical examples. Therefore, it is essential that such a DBMS incorporate safeguards whereby each user of the DBMS system is authorized to make various DBMS requests.

Other aspects of a large DBMS include highly reliable operation, such as 24/7 availability, and very fast response time. Even relatively small delays in response time, magnified by thousands of users, are highly detrimental to enterprise productivity. Therefore, the authorization process discussed supra must not significantly delay a user's request to update or retrieve information. To this end, a large DBMS may retain security information for each active user in cache memory for ready access when the need arises. This enhances performance by eliminating I/O processing that would otherwise be required to access the one or more files to obtain the necessary security information required to perform the authorization checking.

Therefore, caching user security information (hereinafter referred to as a cached user security profile) is known in the art and is a valuable technique for enhancing DBMS performance by eliminating I/O operations to retrieve user security information from files when performing authorization checking for the user. However, this presents a significant problem in those situations where the integrity of the cached user security profiles is compromised by changes to the underlying source security information residing in security files. The obligation to support 24/7 precludes the ability to shut the DBMS down, even for a few minutes, to resynchronize all required cached user security profiles with the information residing in the underlying source security files. On the other hand, allowing access to the DBMS using security information that is not current greatly compromises the integrity of the system.

On one extreme, eliminating all caching of security profile information provides for optimum security by always using up-to-date information from the underlying source security files. However, the overall performance of the DBMS system suffers in that every authorization check incurs substantial I/O overhead. On the other extreme, caching security profile information for an indefinite or extended time period provides for optimal performance, but greatly compromises the integrity of the system by increasing the probability that significant changes to the underlying security files may not be reflected within the cached user security profiles on a timely basis.

Accordingly, there is a great need to provide a way to refresh cached user security profiles that allows an enterprise to balance the security risks associated with cached profiles against the I/O performance impact incurred when a refresh occurs. Furthermore, there is a need to provide for dynamic adjustments to refresh intervals depending upon the changing risk of a particular user and/or changing environmental considerations.

SUMMARY OF THE INVENTION

To overcome these limitations in the prior art briefly described above, the present invention provides a method, program product and system for performing a multi-level refresh of cached user security profiles associated with a client in a database management system. A request is received from a user associated with the client and a transaction aging value is copied to a security aging value associated with the cached user security profile if the transaction aging value is specified with the user request. A decay time is calculated utilizing a profile refresh time stamp associated with the cached user security profile and a system clock. The cached user security profile is then refreshed if a refresh event occurs.

The above method, program product and system for performing a multi-level refresh of cached user security profiles may further comprise receiving a client request from a client and initializing a default aging value for the client. A cached user security profile for the user is created wherein the cached user security profile comprises the security aging value, the profile refresh time stamp, a sub-dynamic aging value and a user security record. The default aging value is copied to the security aging value. Computer instructions that implement a multi-level refresh of cached user security profiles are hereinafter referred to as a "multi-level security profile refresh routine".

In another embodiment of the present invention, the above-described method for performing a multi-level refresh of cached user security profiles may be provided as a computer system. The present invention may also be tangibly embodied in and/or readable from a computer-readable medium containing program code (or alternatively, computer instructions.) Program code, when read and executed by a computer system, causes the computer system to perform the above-described method.

A novel method for performing a refresh of a cached user security profile associated with a client in a database management system is also disclosed. A transaction message is generated wherein the transaction message comprises a transaction aging value and an indication that the transaction aging value is present. The transaction message is sent to the database management system wherein the database management system comprises a multi-level security profile refresh routine and whereby the multi-level security profile refresh routine refreshes the cached user security profile if a refresh event occurs.

In this way, as discussed in greater detail infra, an enterprise can manage cached user security profiles in a manner that provides for balancing the security risks associated with cached user security profiles against the I/O performance impact incurred when a refresh occurs, wherein optimal security and performance are tailored to the particular needs of the enterprise. Furthermore dynamic adjustments to refresh intervals for cached user security profiles, depending upon changes to the risk assessment of a particular user and/or changing environmental considerations, are accommodated.

Various advantages and features of novelty, which characterize the present invention, are pointed out with particularity in the claims annexed hereto and form a part hereof. However, for a better understanding of the invention and its advantages, reference should be made to the accompanying descriptive matter, together with the corresponding drawings which form a further part hereof, in which there is described and illustrated specific examples in accordance with the present invention.

BRIEF DESCRIPTION OF THE DRAWINGS

The present invention is described in conjunction with the appended drawings, where like reference numbers denote the same element throughout the set of drawings.

DETAILED DESCRIPTION

The present invention overcomes the problems associated with the prior art by teaching a system, computer program product, and method for performing a multi-level refresh of a cached user security profile associated with a client in a database management system. Caching user security information is a valuable technique for enhancing DBMS performance by eliminating I/O operations to retrieve user security information from files when performing authorization checking for the user. However, this presents a significant problem in those situations where the integrity of the cached user security profiles is compromised by changes to the underlying source security information residing in one or more security files. The obligation to support 24/7 precludes the ability to shut the DBMS down, even for a few minutes, to resynchronize all required cached user security profiles with the information residing in the underlying one or more source security files. On the other hand, allowing access to the DBMS using security information that is not current greatly compromises the integrity of the system.

On one extreme, eliminating all caching of security profile information provides for optimum security by always using up-to-date information from the underlying one or more source security files. However, the overall performance of the DBMS system suffers in that every authorization check incurs substantial I/O overhead. On the other extreme, caching security profile information for an indefinite or extended time period provides for optimal performance, but greatly compromises the integrity of the system by increasing the probability that significant changes to the information residing in the underlying one or more security files may not be reflected within the cached user security profiles on a timely basis.

The present disclosure teaches a multi-level refresh of a cached user security profile whereby an enterprise balances the security risks associated with cached profiles against the I/O performance impact incurred when a refresh occurs. Dynamic adjustments to refresh intervals can be accommodated depending upon the changing risk of a particular user and/or changing environmental considerations. Refresh intervals can be established during client connect processing and adjustments to these intervals can be optionally made during user transaction processing. Furthermore, global command refresh can be utilized to override the interval established at client connect and/or user transaction processing.

In the following detailed description, numerous specific details are set forth in order to provide a thorough understanding of the present invention. Those skilled in the art will recognize, however, that the teaching contained herein may be applied to other embodiments and that the present invention may be practiced apart from these specific details. Accordingly, the present invention should not be limited to the embodiments shown but is to be accorded the widest scope consistent with the principles and features described and claimed herein. The following description is presented to enable one of ordinary skill in the art to make and use the present invention and is provided in the context of a patent application and its requirements.

Figure 1:
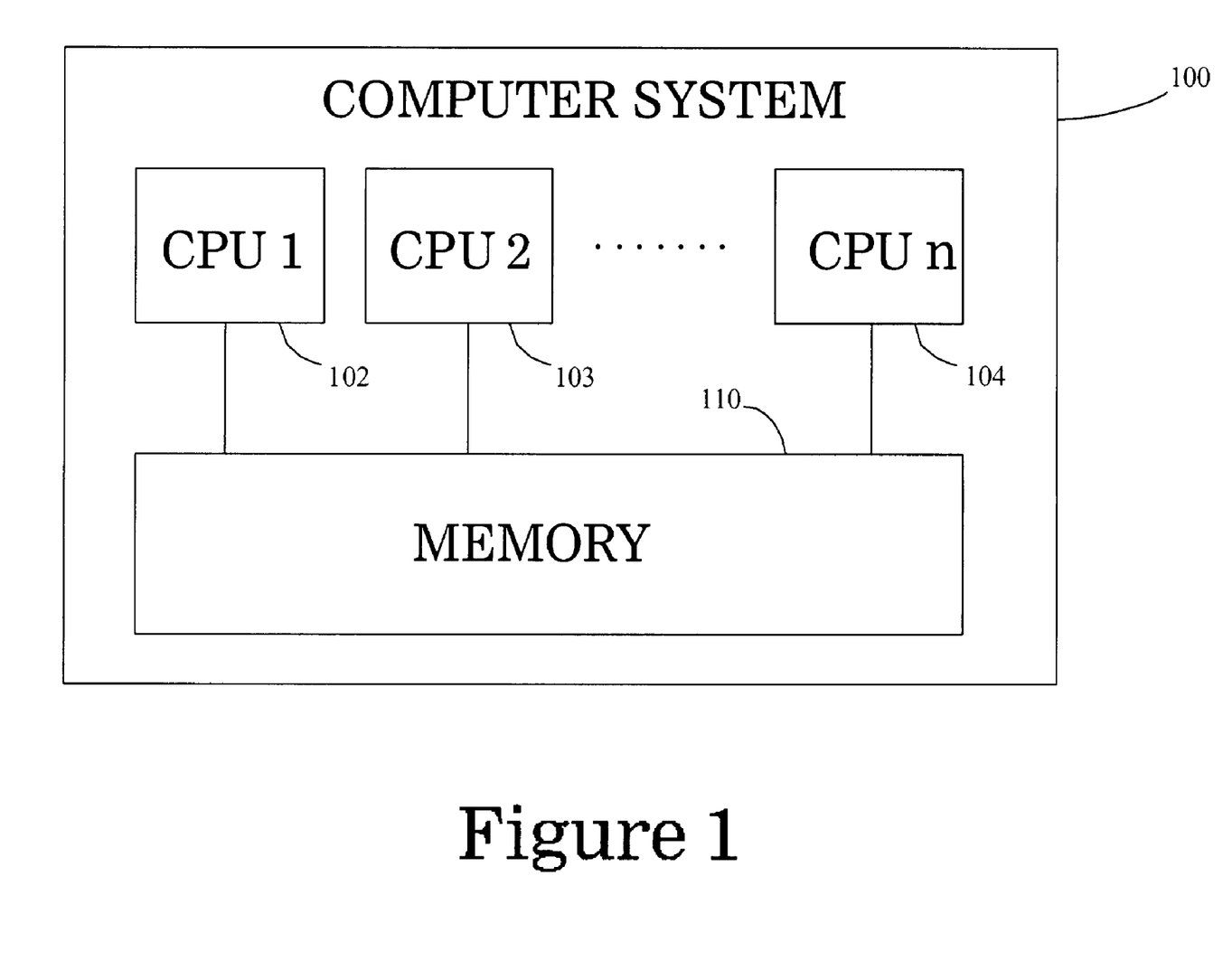
FIG. 1 is a block diagram of a typical computer system wherein the present invention may be practiced.

FIG. 1 is a block diagram of a computer system 100, such as the zSeries mainframe computer system, in which teachings of the present invention may be embodied. (zSeries is a trademark of International Business Machines Corporation in the United States, other countries, or both.) The computer system 100 comprises one or more central processing units (CPUs) 102, 103, and 104. The CPUs 102–104 suitably operate together in concert with memory 110 in order to execute a variety of tasks. In accordance with techniques known in the art, numerous other components may be utilized with computer system 100, such as input/output devices comprising keyboards, displays, direct access storage devices (DASDs), printers, tapes, etc. (not shown).

Although the present invention is described in a particular hardware environment, those of ordinary skill in the art will recognize and appreciate that this is meant to be illustrative and not restrictive of the present invention. Those of ordinary skill in the art will further appreciate that a wide range of computers and computing system configurations can be used to support the methods of the present invention, including, for example, configurations encompassing multiple systems, the internet, and distributed networks. Accordingly, the teachings contained herein should be viewed as highly "scalable", meaning that they are adaptable to implementation on one, or several thousand, computer systems.

Figure 2:
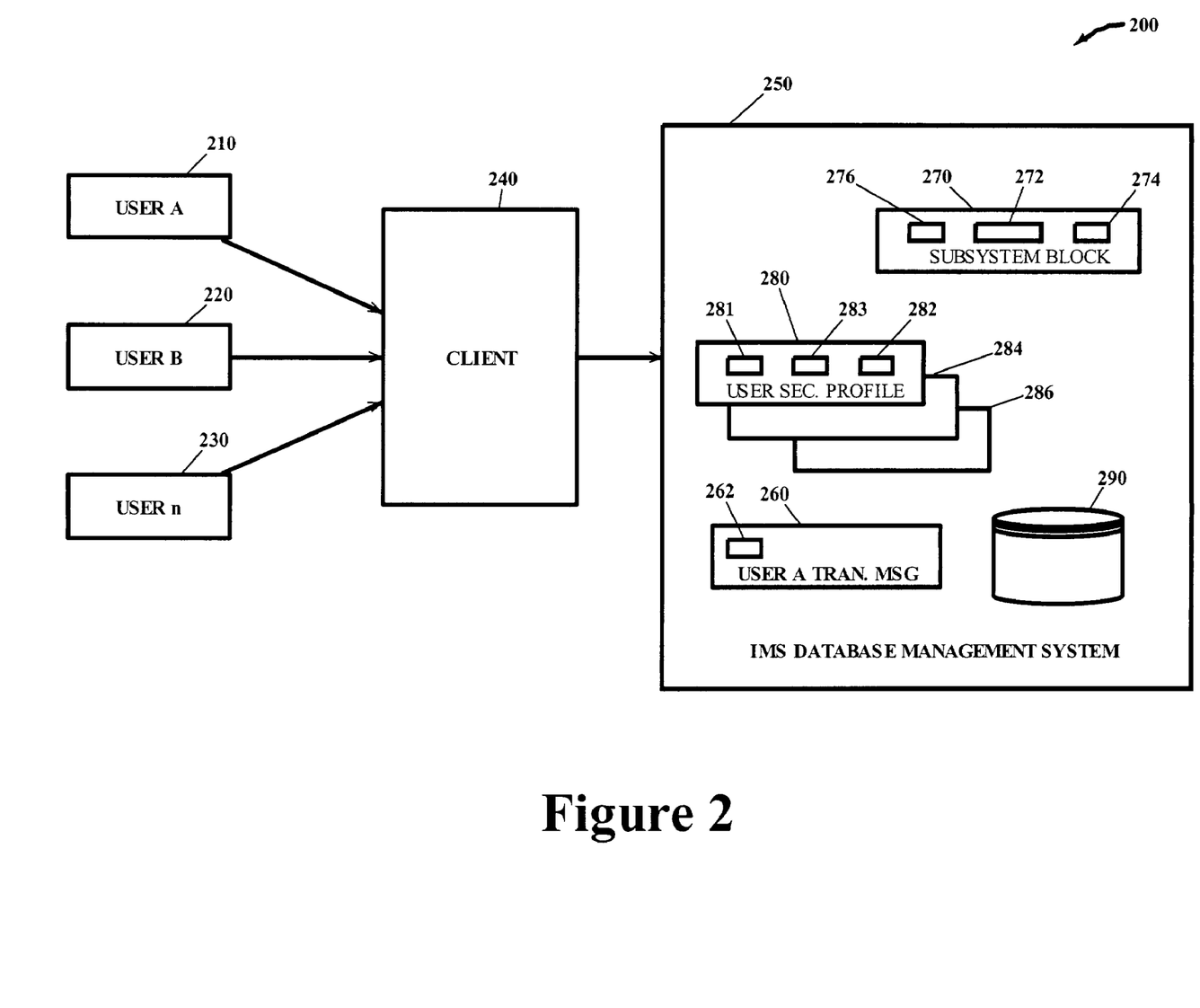
FIG. 2 shows a block diagram of an exemplary DBMS in accordance with the present invention.

Referring now to FIG. 2, a block diagram is shown illustrating an exemplary operating environment 200 wherein the present invention may be practiced. Users 210, 220 and 230, representing user A, user B and user n, respectively, are associated with IMS client 240. Client 240 is a software application that provides users 210–230 indirect access to IMS services. Typically, the number of users connected to client 240 can be very large, numbering into the tens of thousands in some installations. Exemplary client 240 software includes, for example, middleware products IMS Connect, MQSeries, Websphere etc. (MQSeries and Websphere are registered trademarks of International Business Machines Corporation in the United States, other countries, or both).

Client 240 communicates with IMS database management system 250. IMS 250 comprises subsystem block 270. Subsystem block 270 is associated with client 240 and is generated when client 240 first communicates with IMS 250. Subsystem block 270 comprises a creation timestamp 272, representing the current time stamp value requested from computer system 100 via the system clock value at the point in time in which subsystem block 270 is created. Subsystem block 270 further comprises master dynamic aging value (MDAV) 274. The master dynamic aging value 274 is initially set to zero when subsystem block 270 is first created and is adjusted to a non-zero value upon performing a global command security refresh, as discussed in greater detail infra in conjunction with flow diagram 500 of FIG. 5. Further still, subsystem block 270 comprises default aging value (DAV) 276. Default aging value 276 is specified by client 240 during client connect processing and is utilized during the build of cached user security profiles, as discussed in greater detail infra in conjunction with flow diagram 700, FIG. 7.

IMS 250 further comprises cached user security profiles 280, 284 and 286, associated with users 210 through 230, respectively. Cached user security profile 280 comprises security aging value (SAV) 281, sub-dynamic aging value (SDAV) 282 and profile refresh time stamp 283 discussed in greater detail infra in conjunction with flow diagrams 600, 700 and 800 of FIGS. 6, 7 and 8, respectively.

Likewise, cached user security profiles 284 and 286 also each contain elements 281 through 283, but these details have been eliminated firm user security profiles 284 and 286 for simplicity, as this disclosure may be fully understood by following an example utilizing a request from USER A 210 and associated user profile 280 with the understanding that this processing may be applicable to USER B 220 and USER n 230 as well.

IMS 250 further comprises transaction message 260, representing a transaction request from USER A 210. Transaction message 260 contains information specifying the particular transaction to be performed, such as a transaction ID, a database name, search arguments, etc. (not shown). Additionally, transaction message 260 optionally contains a transaction aging value (TAV) 262, discussed in greater detail infra in conjunction with flow diagram 600 of FIG. 6.

Further still, IMS 250 comprises permanent storage 290. Permanent storage 290 contains the source security file(s) in the form of user security records (not shown) for users 210–230 from which cached user security profiles 280, 284 and 286, respectively, are generated and refreshed. This process will be more fully understood from the detailed explanations accompanying flow diagrams 300, 400, 500, 600, 700 and 800 from FIGS. 3, 4, 5, 6, 7, and 8, respectively. Those of ordinary skill in the art will recognize that permanent storage 290 may take one or several of numerous permanent storage forms, such as magnetic disk, magnetic tape, flash electronic memory, optical disk and the like. Those of ordinary skill in the art will further recognize that storage 290 may formatted in a variety of logical formats, such as sequential files, keyed files, relational databases, hierarchical databases, and the like.

While the above block diagram 200 represents a suitable structure for teaching the present invention, it is to be understood that the purpose of this structure is of an exemplary nature and that numerous other structures may serve equally well in teaching the present invention. For example, other database management systems could be utilized in place of IMS and client 240 could be a custom software application developed for a single computer system as well as a generally available program product, such as IBM's MQSeries. Accordingly, the present invention is not limited to the particular exemplary structures but is to be accorded the widest scope consistent with the principles and features described herein.

Generally, the novel methods disclosed herein may be tangibly embodied in and/or readable from a computer-readable medium containing the program code (or alternatively, computer instructions), which when read and executed by computer system 100 causes computer system 100 to perform the steps necessary to implement and/or use the present invention. Thus, the present invention may be implemented as a method, an apparatus, or an article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Examples of a computer readable device, carrier or media include, but are not limited to, palpable physical media such as a CD ROM, diskette, hard drive and the like, as well as other non-palpable physical media such as a carrier signal, whether over wires or wireless, when the program is distributed electronically.

Figure 3:
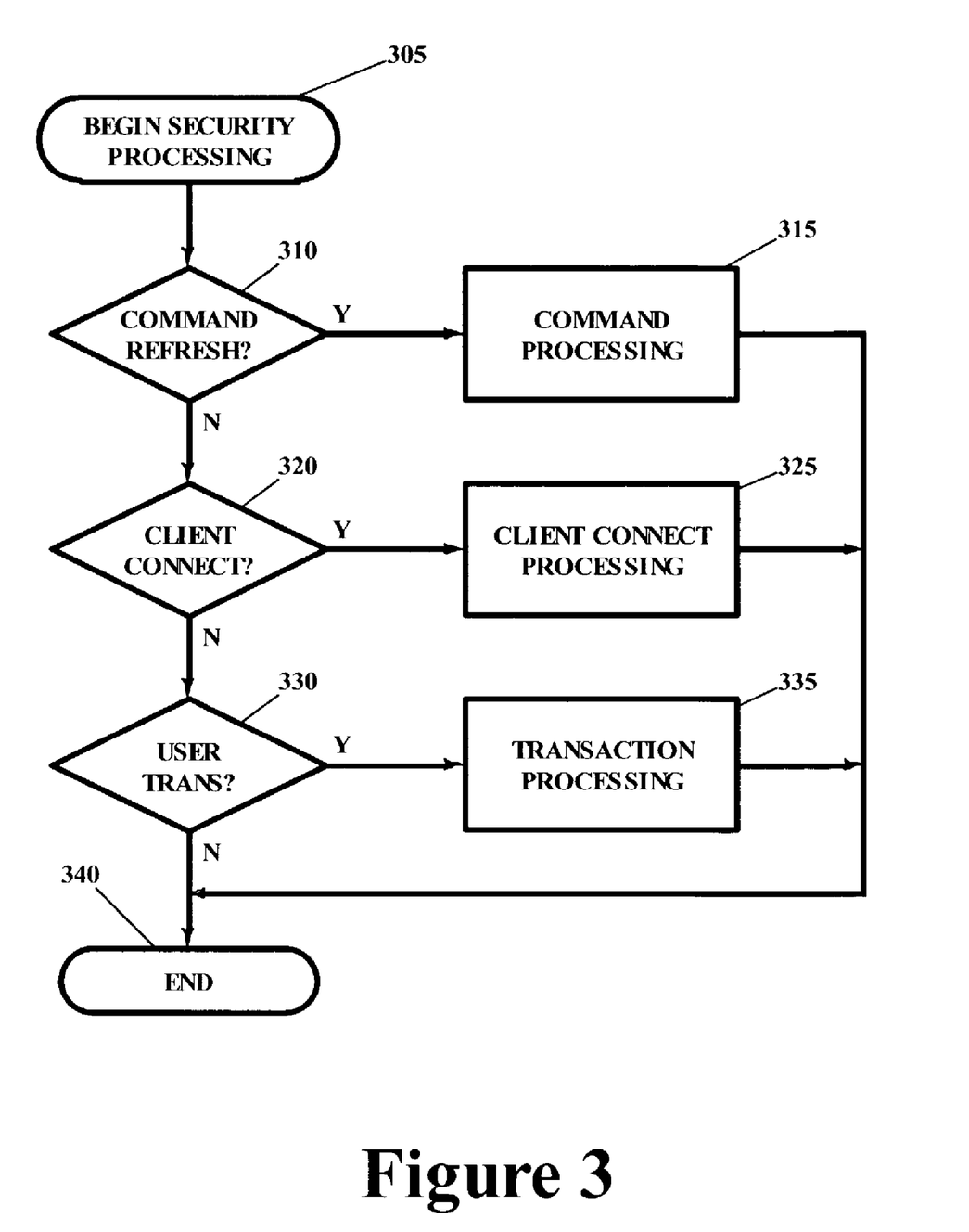
FIG. 3 is a flow diagram summarizing security processing in accordance with one embodiment of the present invention.

Referring now to FIG. 3, flow diagram 300 illustrates the high level logic flow of a preferred embodiment for performing authorization checking in accordance with the present invention. First, in step 305, a request requiring security processing is received by IMS database system 250. In step 310 a test determines if this is a global command refresh request. If so, in step 315, global command refresh processing is performed, as described infra in conjunction with flow diagram 500, FIG. 5. Global command refresh processing is more fully documented in the Global Security Profile Refresh application, identified supra under the heading "CROSS-REFERENCE TO RELATED APPLICATIONS." Following step 315, security processing terminates at step 340.

Returning now to step 310, if this is not a global command refresh request, then processing proceeds to step 320 where a test is made to determine if this is a client connect request. If so, in step 325, client connect security processing is performed, as described infra in conjunction with flow diagram 400 FIG. 4. Following step 325, security processing terminates at step 340.

Returning now to step 320, if this is not a client connect request, then processing proceeds to step 330 where a test is made to determine if this is a user transaction request. If so, in step 335, user transaction security processing is performed, as described infra in conjunction with flow diagram 600, FIG. 6. Following step 335, security processing terminates at step 340. Returning now to step 330, if this is not a user transaction request, then it is determined that no other security processing is required and accordingly processing terminates at step 340.

Figure 4:
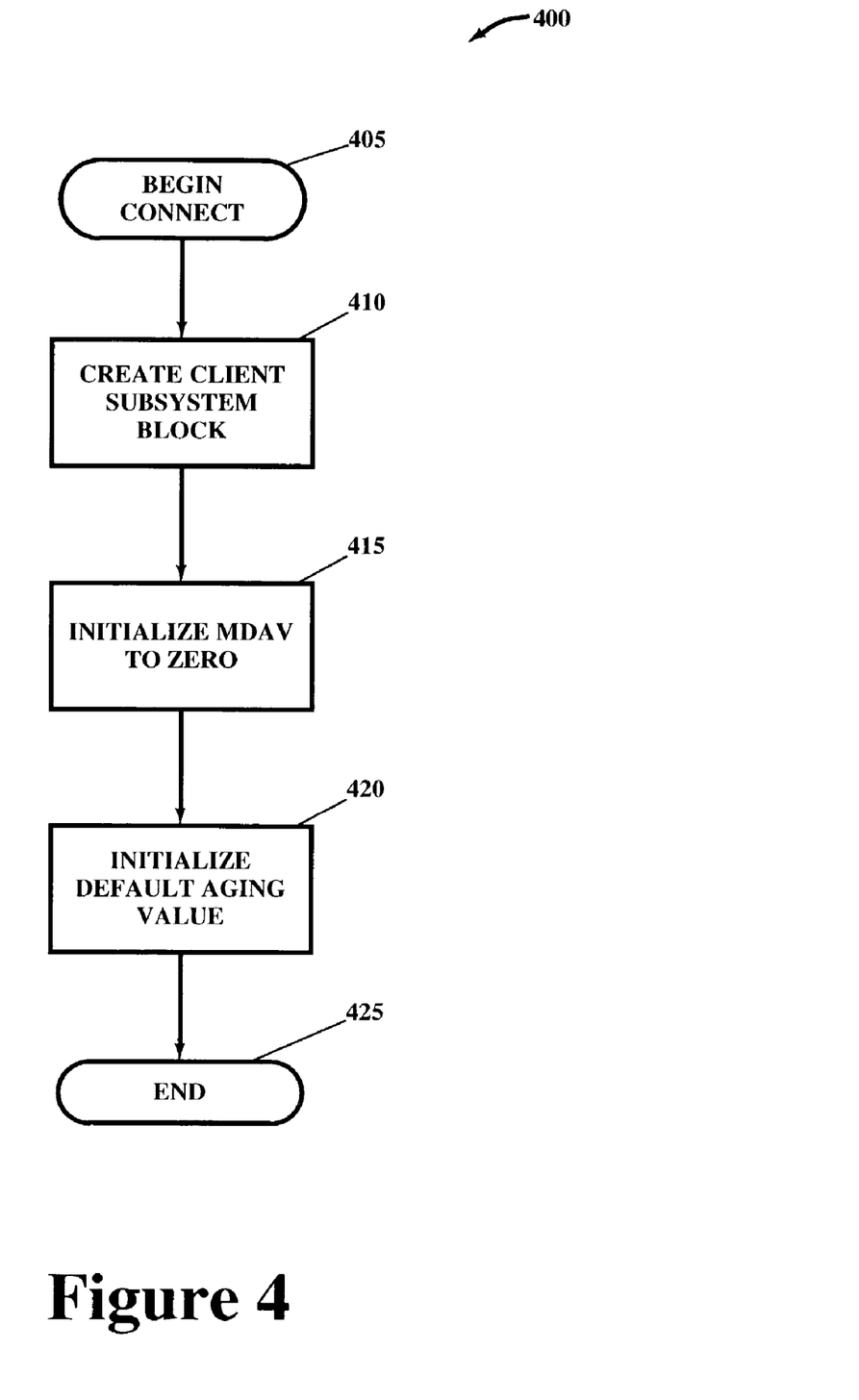
FIG. 4 is a flow diagram summarizing client connect security processing in accordance with one embodiment of the present invention.

Referring now to FIG. 4, flow diagram 400 illustrates the high level logic flow of a preferred embodiment for performing security processing during a client connect request in accordance with the present invention. Referring now to step 405, a client connect request is received. In step 410 a client subsystem block 270 is created for the connecting client. Continuing with step 415, the master dynamic aging value 274 within the client subsystem block 270 is initialized to zero. Then, in step 420, the default aging value 276 within the client subsystem block 270 is initialized to a client specified value. The default aging value 276 is used as the initial security aging value 281 within cached user security profile 280. This initial security aging value 281, as described in greater detail infra in conjunction with flow diagram 600 of FIG. 6, may subsequently be replaced with transaction aging value 262, if specified, within user transaction message 260. In step 425, client connect processing completes.

Figure 5:
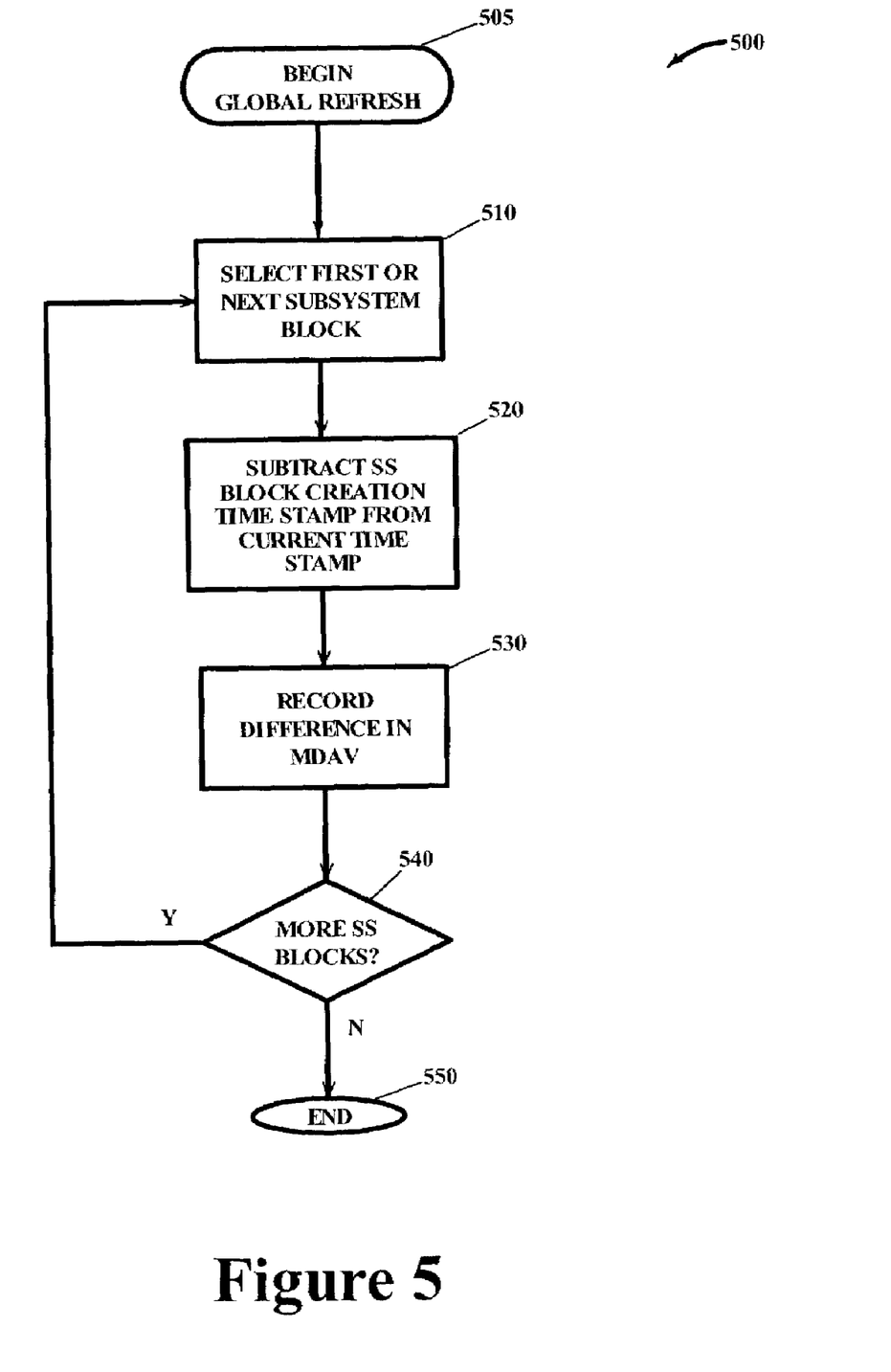
FIG. 5 is a flow diagram summarizing global command refresh processing in accordance with one embodiment of the present invention.

Referring now to FIG. 5, flow diagram 500 illustrates the high level logic flow of a preferred embodiment for performing a global command refresh in accordance with the present invention. In step 505, a global command refresh command is received. Continuing with step 510, the first or next subsystem block 270 is selected. In step 520, the subsystem block creation time stamp 272 is subtracted from the current time stamp and, in step 530, the difference is recorded in the master dynamic aging value 274.

In step 540, a test is made to determine if additional subsystem blocks remain to be processed and, if so, processing returns to step 510, as described supra, to perform additional processing for the unprocessed subsystem block. Otherwise, global command refresh processing is completed and processing terminates at step 550. Global command refresh processing is more fully described in the Global Security Profile Refresh application, identified supra under the heading "CROSS-REFERENCE TO RELATED APPLICATIONS."

Figure 6:
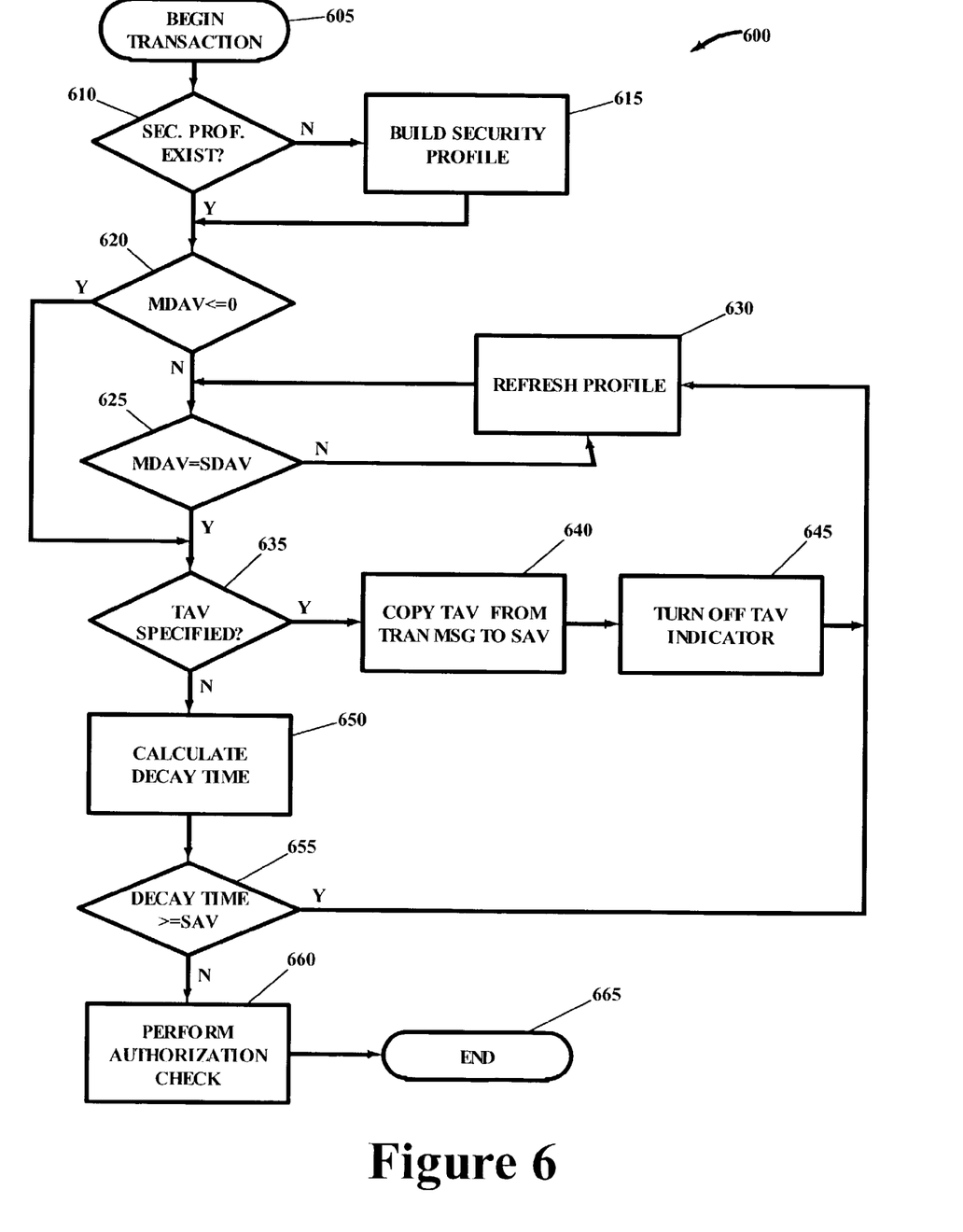
FIG. 6 is a flow diagram summarizing transaction security processing in accordance with one embodiment of the present invention.

Referring now to FIG. 6, flow diagram 600 illustrates the high level logic flow of a preferred embodiment for performing security processing for a user transaction request in accordance with the present invention. In step 605, a user transaction request is received and security processing for that request begins. In step 610, a test is made to determine if a cached user security profile 280 already exists for the user associated with the transaction. If not, in step 615, cached user security profile 280 is built prior to proceeding with step 620. Building a cached user security profile is discussed in greater detail infra in conjunction with flow diagram 700, FIG. 7.

Continuing now with step 620, a test is made to determine if the master dynamic aging value 274 is less than or equal to zero. If so, it is determined that a global command refresh does not encompass cached user security profile 280 and, accordingly, processing continues with step 635. Otherwise, a further test is made, in step 625, to determine if cached user security profile 280 is encompassed by a global command refresh by testing to see if the master dynamic aging value 274 is equal to the sub-dynamic aging value 282. If these values are equal, then a global command refresh does not encompass cached user security profile 280 and, accordingly, processing continues with step 635. Otherwise, a global command refresh encompasses cached user security profile 280. In this case, cached user security profile 280 is refreshed in step 630 and, once again, in step 625, the MDAV and SDAV are tested for equality. Refreshing a cached user security profile is discussed in greater detail infra in conjunction with flow diagram 800, FIG. 8.

Ultimately, the test at step 625 is satisfied and processing continues with step 635 where a test is made to determine if transaction aging value 262 has been specified. Those of ordinary skill in the art will recognize that there are numerous ways to specify the existence of a passed parameter, such as transaction aging value 262. In a preferred embodiment, a bit is set within the transaction message (not shown) to indicate the existence of a transaction aging value within the transaction message. In another embodiment, a fixed field location within a transaction message could be utilized wherein a non-zero or non-null value in this field simultaneously reflects its existence and specifies its value. These and numerous other techniques known in the art may be used to specify a transaction aging value.

If transaction aging value 262 has been specified, processing continues with step 640 where specified transaction aging value 262 is copied to the security aging value 281 within cached user security profile 280. Then, in step 645, the indicator reflecting the existence of transaction aging value 262 is turned off and processing continues with step 630, discussed supra. Note that, upon completion of step 645, unless another transaction aging value is specified on a subsequent transaction, any future tests at step 635 will reflect that the TAV has not been specified.

In alternative embodiments other conditions may be used to determine if a refresh event has occured. For example, the refresh processing at step 630 could be performed only if specified transaction aging value 262 is greater than the existing security aging value 281. In another example, step 630 could be deferred until a positive condition is detected at step 655, discussed infra.

Returning now to step 635, if transaction aging value 262 has not been specified, processing continues with step 650 where a decay time is calculated. A decay time is calculated by subtracting the profile refresh time stamp 283 associated with the cached user security profile 280 from the current system clock value. The profile refresh time stamp 283 reflects the system clock value at the time at which the information in cached user security profile 280 is known to be current. This currency occurs at one of two times–either cached user security profile build, or cached user security profile refresh. Therefore, in simple terms, decay time is the age of the cached information.

Continuing with step 655, if the decay time calculated in step 650 is greater or equal to the security aging value 281 within cached user security profile 280, then processing transfers to step 630, discussed supra. Otherwise, processing continues to step 660 where the currently cached security information contained with cached user security profile 280 is utilized to perform the authorization checking for this transaction. In step 665, security processing for the user transaction terminates.

Figure 7:
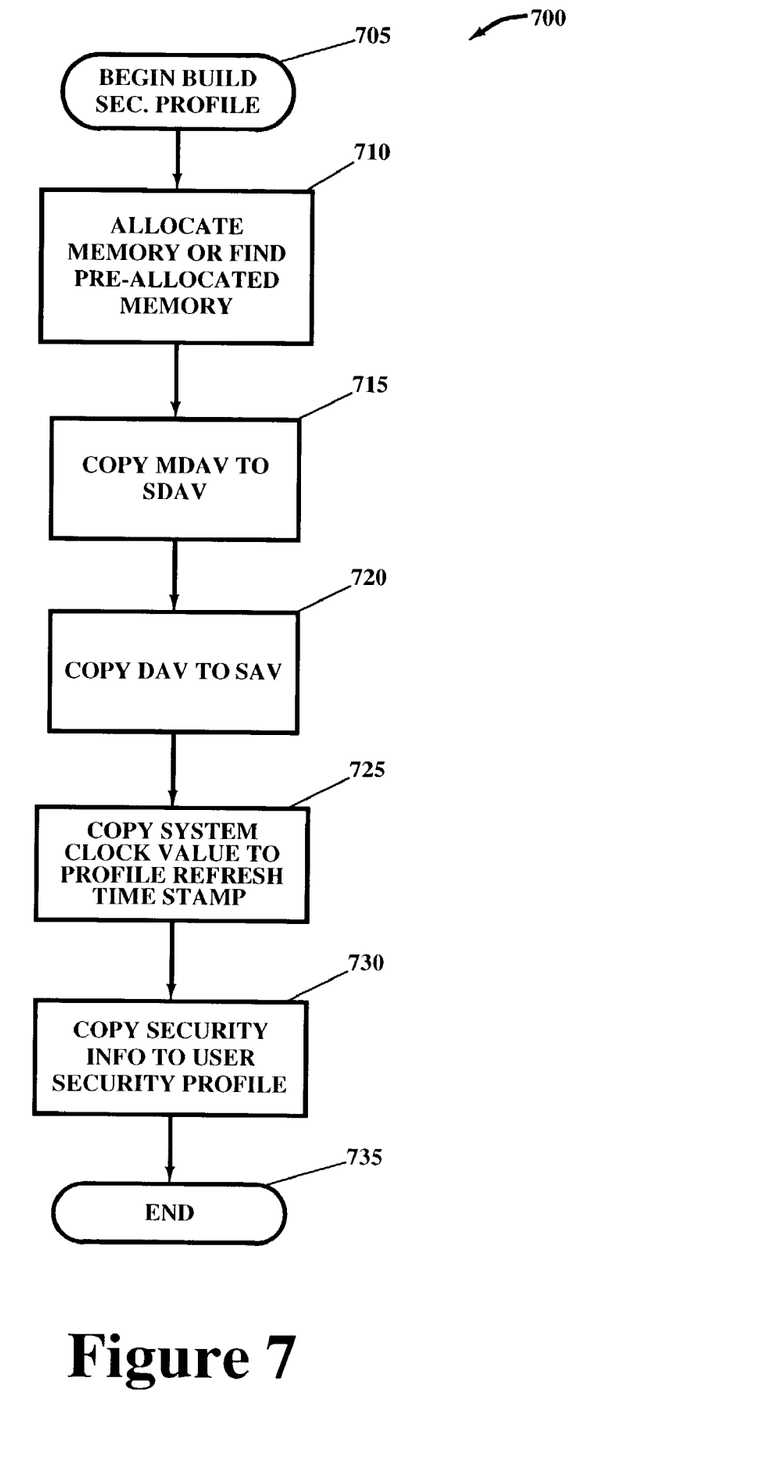
FIG. 7 is a flow diagram summarizing security profile build processing in accordance with one embodiment of the present invention.

Referring now to FIG. 7, flow diagram 700 illustrates the high level logic flow of a preferred embodiment for building a cached user security profile in accordance with the present invention. In step 705, the build processing for a cached user security profile 280 is initiated. In step 710, computer memory is allocated in which to build cached user security profile 280. In an alternative embodiment, memory is pre-allocated during client connect processing into profile units for all cached user security profiles. In this alternative embodiment, rather than allocate memory, a pre-allocated profile unit available for use is located.

Next, in step 715, the master dynamic aging value 274 is copied from the client subsystem block 270 to the sub-dynamic aging value 282 field of cached user security profile 280. This information is used for global command refresh processing, as described in greater detail in the Global Security Profile Refresh application, identified supra under the heading "CROSS-REFERENCE TO RELATED APPLICATIONS." In step 720, the default aging value 276 is copied from the client subsystem block 270 to security aging value 281 of cached user security profile 280.

Continuing with step 725, the current system clock value is obtained and copied into profile refresh time stamp 283 of cached user security profile 280. Then, in step 730, the source user security record is copied from permanent storage 290 into cached user security profile 280. Those of ordinary skill in the art will appreciate that, alternatively, selected information from the source user security record may be copied, rather than the entire record. The information that is copied, whether the entire record or selected portions thereof, is hereinafter considered to be a copy of the source user security record. Cached user security profile 280 build is now complete and, accordingly, processing terminates at step 735.

Figure 8:
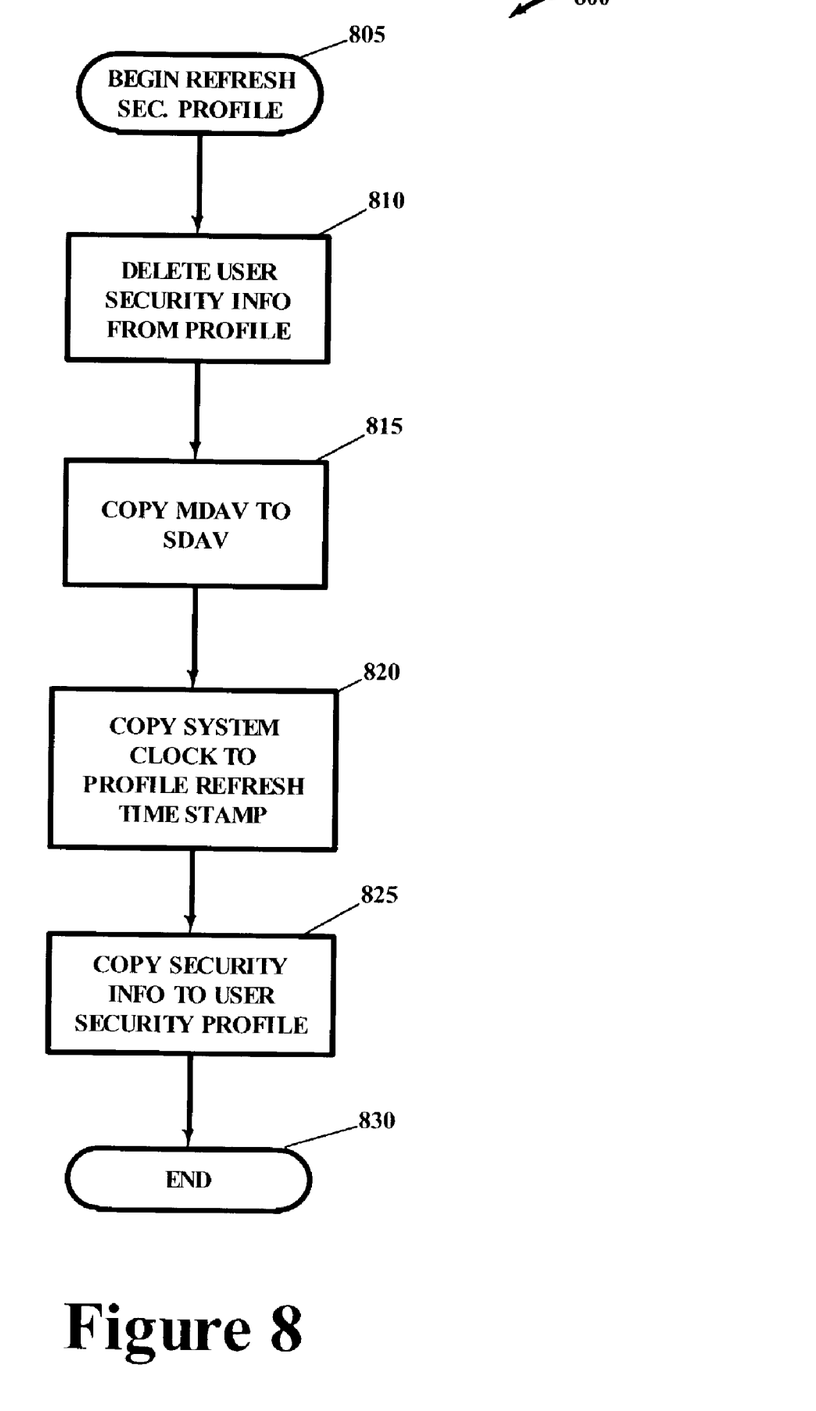
FIG. 8 is a flow diagram summarizing security profile refresh processing in accordance with one embodiment of the present invention.

Referring now to FIG. 8, flow diagram 800 illustrates the high level logic flow of a preferred embodiment for refreshing a cached user security profile in accordance with the present invention. In step 805, cached user security profile 280 refresh processing begins. In step 810, all existing information contained within cached user security profile 280 is deleted.

Next, in step 815, the master dynamic aging value 274 is copied from the client subsystem block 270 to sub-dynamic aging value 282 of cached user security profile 280. This information is used for global command refresh processing, as described in greater detail in the Global Security Profile Refresh application, identified supra under the heading "CROSS-REFERENCE TO RELATED APPLICATIONS." Continuing with step 820, the current system clock value is obtained and copied into profile refresh time stamp 283 of cached user security profile 280. Then, in step 825, the source user security record is copied from permanent storage 290 into cached user security profile 280. Cached user security profile 280 refresh is now complete and, accordingly, processing terminates at step 830.

Taken in combination, flow diagram 300, 400, 500, 600, 700 and 800 of FIGS. 3, 4, 5, 6, 7 and 8, respectively, in conjunction with supporting diagrams and detailed descriptions, provide for an improved method for managing cached user security profiles. The present disclosure teaches a multi-level refresh of cached user security profiles whereby an enterprise balances the security risks associated with cached profiles against the I/O performance impact incurred when a refresh occurs. Dynamic adjustments to refresh intervals are accommodated depending upon the changing risk of a particular user and/or changing environmental considerations. Refresh intervals can be established during client connect processing and adjustments to these intervals can be optionally made during user transaction processing. Furthermore, a global command refresh can be utilized to override the interval established at client connect and/or user transaction processing. Accordingly, the disclosed multi-level refresh schema provides for optimizing all of the performance benefits from caching user security profiles, while reducing the risk of using obsolete cached security information to an acceptable level.

Although the preferred embodiment has been disclosed using IMS as an exemplary platform, those of ordinary skill in the art will appreciate that the teachings contained herein apply to any DBMS. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. § 112, sixth paragraph, unless the element is expressly recited using the phrase "means for" or "step for."

While the preferred embodiment of the present invention has been described in detail, it will be understood that modifications and adaptations to the embodiment(s) shown may occur to one of ordinary skill in the art without departing from the scope of the present invention as set forth in the following claims. Thus, the scope of this invention is to be construed according to the appended claims and not limited by the specific details disclosed in the exemplary embodiments.

What is claimed:

1. A computer implemented method for performing a multi-level refresh of a cached user security profile associated with a client in a database management system comprising the steps of:
   receiving a user request from a user associated with said client, wherein the user request comprises a transaction aging value defining an updated maximum time for trusting a cached user security profile without a refresh from a permanent data store;
   in response to the presence of said transaction aging value on the user request, copying the transaction aging value to a security aging value associated with said cached user security profile;
   calculating a decay time equal to the time since the user security profile in cache was last refreshed from a permanent data store utilizing a profile refresh time stamp associated with said cached user security profile and a system clock; and
   refreshing said cached user security profile from the permanent data store in response to a refresh event, wherein said client is a software application, and wherein said refresh event occurs in response to one of the decay time being larger than the security aging value, and the security aging value being larger than the transaction aging value prior to said copying step.

2. The method of claim 1 further comprising the steps of:
   receiving a client request from said client;
   initializing a default aging value for said client;
   creating said cached user security profile for said user wherein said cached user security profile comprises said security aging value, said profile refresh time stamp, a sub-dynamic aging value and a user security record; and copying said default aging value to said security aging value.

3. The method of claim 2 wherein said refresh event occurs if a global command refresh encompasses said cached user security profile.

4. The method of claim 2 wherein creating said cached user security profile comprises:
   allocating memory to contain said cached user security profile;
   copying a master dynamic aging value to said sub-dynamic aging value;
   copying said default aging value to said security aging value;
   copying a system clock value to said profile refresh time stamp; and
   copying a record from a security file to said user security record.

5. The method of claim 4 wherein said allocating comprises locating an available pre-allocated user security profile in memory.

6. The method of claim 2 wherein refreshing said cached user security profile comprises:
   deleting existing information within said cached user security profile;
   copying a master dynamic aging value to said sub-dynamic aging value;
   copying a system clock value to said profile refresh time stamp; and
   copying a record from a security file to said user security record.

7. The method of claim 1 wherein said database management system is IMS.

8. A method for performing a multi-level refresh of a cached user security profile associated with a client in a database management system comprising:
   generating a transaction message wherein said transaction message comprises a transaction aging value and an indication that said transaction aging value is present wherein the transaction aging value defines an updated maximum time for trusting a cached user security profile without a refresh from a permanent data store; and
   sending said transaction message to said database management system wherein said database management system comprises a multi-level security profile refresh routine and whereby said multi-level security profile refresh routine refreshes said cached user security profile if in response to the occurrence of a refresh event comprising, the occurrence of a decay time being larger than a security aging value, and
   wherein the client is a software application.

9. The method of claim 8 wherein said refresh event occurs if a global command refresh encompasses said cached user security profile.

10. A computer system for performing a multi-level refresh of a cached user security profile associated with a client software application in a database management system comprising:
   a computer;
   means for receiving a user request from a user associated with said client software application;
   means for copying a transaction aging value to a security aging value associated with said cached user security profile if said transaction aging value is specified with said user request, wherein the transaction aging value defines an updated maximum time for trusting a cached user security profile without a refresh from a permanent data store;
   means for calculating a decay time utilizing a profile refresh time stamp associated with said cached user security profile and a system clock; and
   means for refreshing said cached user security profile if in response to a refresh event comprising the occurrence of the decay time being larger than the security aging value.

11. The computer system of claim 10 wherein said refresh event occurs if said security aging value prior to said copying step is larger than said transaction aging value.

12. The computer system of claim 10 wherein said refresh event occurs if said transaction value is specified with said user request.

13. The computer system of claim 10 further comprising:
   means for receiving a client request from said client;
   means for initializing a default aging value for said client;
   means for creating said cached user security profile for said user wherein said cached user security profile comprises said security aging value, said profile refresh time stamp, a sub-dynamic aging value and a user security record; and
   means for copying said default aging value to said security aging value.

14. The computer system of claim 13 wherein said refresh event occurs if a global command refresh encompasses said cached user security profile.

15. The computer system of claim 13 wherein said means for creating said cached user security profile comprises:
   means for allocating memory to contain said cached user security profile;
   means for copying a master dynamic aging value to said sub-dynamic aging value;
   means for copying said default aging value to said security aging value;
   means for copying a system clock value to said profile refresh time stamp; and
   means for copying a record from a security file to said user security record.

16. The computer system of claim 15 wherein said means for allocating comprises locating an available pre-allocated user security profile in memory.

17. The computer system of claim 13 wherein means for refreshing said cached user security profile comprises:
   means for deleting existing information within said cached user security profile;
   means for copying a master dynamic aging value to said sub-dynamic aging value;
   means for copying a system clock value to said profile refresh time stamp; and
   means for copying a record from a security file to said user security record.

18. The computer system of claim 10 wherein said database management system is IMS.

19. An article of manufacture for use in a computer system tangibly embodying computer instructions executable by said computer system to perform process steps for performing a multi-level refresh of a cached user security profile associated with a client in a database management system, said process steps comprising:
   receiving a user request from a user associated with said client;
   copying a transaction aging value to a security aging value associated with said cached user security profile if said transaction aging value is specified with said user request wherein the transaction aging value defines an updated maximum time for trusting a cached user security profile without a refresh from a permanent data store;

calculating a decay time utilizing a profile refresh time stamp associated with said cached user security profile and a system clock; and refreshing said cached user security profile in response to the occurrence of if a refresh event comprising the decay time being larger than the security aging value, wherein said client is a software application.

20. The article of manufacture of claim 19 wherein said refresh event occurs if said security aging value prior to said copying step is larger than said transaction aging value.

21. The article of manufacture of claim 19 wherein said refresh event occurs if said transaction value is specified with said user request.

22. The article of manufacture of claim 19 further comprising the steps of receiving a client request from said client;

initializing a default aging value for said client;

creating said cached user security profile for said user wherein said cached user security profile comprises said security aging value, said profile refresh time stamp, a sub-dynamic aging value and a user security record; and copying said default aging value to said security aging value.

23. The article of manufacture of claim 22 wherein said refresh event occurs if a global command refresh encompasses said cached user security profile.

24. The article of manufacture of claim 22 wherein creating said cached user security profile comprises:

allocating memory to contain said cached user security profile;

copying a master dynamic aging value to said sub-dynamic aging value;

copying said default aging value to said security aging value;

copying a system clock value to said profile refresh time stamp; and copying a record from a security file to said user security record.

25. The article of manufacture of claim 24 wherein said allocating comprises locating an available pre-allocated user security profile in memory.

26. The article of manufacture of claim 22 wherein refreshing said cached user security profile comprises:

deleting existing information within said cached user security profile;

copying a master dynamic aging value to said sub-dynamic aging value;

copying a system clock value to said profile refresh time stamp; and copying a record from a security file to said user security record.

27. The article of manufacture of claim 19 wherein said database management system is IMS.

* * * * *